(12) United States Patent
Suzuki et al.

(10) Patent No.: US 10,786,848 B2
(45) Date of Patent: Sep. 29, 2020

(54) EXPANDABLE METHYL METHACRYLATE RESIN PARTICLES, PRE-EXPANDED PARTICLES, EXPANSION MOLDED ARTICLE, AND LOST FOAM

(71) Applicant: KANEKA CORPORATION, Osaka-shi (JP)

(72) Inventors: Kirito Suzuki, Takasago (JP); Mitsuhiro Tamura, Takasago (JP); Tatsuya Henmi, Takasago (JP)

(73) Assignee: KANEKA CORPORATION, Osaka-shi (JP)

( * ) Notice: Subject to any disclaimer, the term of this patent is extended or adjusted under 35 U.S.C. 154(b) by 732 days.

(21) Appl. No.: 15/510,324

(22) PCT Filed: Sep. 14, 2015

(86) PCT No.: PCT/JP2015/076059
§ 371 (c)(1),
(2) Date: Mar. 10, 2017

(87) PCT Pub. No.: WO2016/047490
PCT Pub. Date: Mar. 31, 2016

(65) Prior Publication Data
US 2017/0291216 A1    Oct. 12, 2017

(30) Foreign Application Priority Data

Sep. 22, 2014   (JP) .................. 2014-192421

(51) Int. Cl.
| | |
|---|---|
| C08J 9/20 | (2006.01) |
| C08J 9/232 | (2006.01) |
| B22C 7/02 | (2006.01) |
| C08J 9/14 | (2006.01) |
| C08L 33/12 | (2006.01) |
| C08F 220/14 | (2006.01) |
| C08J 9/18 | (2006.01) |
| C08J 9/228 | (2006.01) |

(52) U.S. Cl.
CPC ............ *B22C 7/023* (2013.01); *C08F 220/14* (2013.01); *C08J 9/141* (2013.01); *C08J 9/18* (2013.01); *C08J 9/20* (2013.01); *C08J 9/228* (2013.01); *C08J 9/232* (2013.01); *C08L 33/12* (2013.01); *C08J 2201/026* (2013.01); *C08J 2203/14* (2013.01); *C08J 2203/182* (2013.01); *C08J 2203/202* (2013.01); *C08J 2207/00* (2013.01); *C08J 2333/08* (2013.01); *C08J 2333/12* (2013.01)

(58) Field of Classification Search
CPC ....... C08J 9/16; C08J 9/20; C08J 9/228; C08J 9/232; C08J 2333/08; C08J 2333/10; C08J 2333/12; C08J 2201/026
See application file for complete search history.

(56) References Cited

U.S. PATENT DOCUMENTS

| | | | |
|---|---|---|---|
| 3,615,972 | A | 10/1971 | Morehouse, Jr. et al. |
| 2007/0254972 | A1 | 11/2007 | Haraguchi |

FOREIGN PATENT DOCUMENTS

| | | | |
|---|---|---|---|
| JP | 11-269300 A | | 10/1999 |
| JP | 11-310657 A | | 11/1999 |
| JP | 2001-123001 A | | 5/2001 |
| JP | 2001-233986 A | | 8/2001 |
| JP | 2001233986 A | * | 8/2001 |
| JP | 2001-302733 A | | 10/2001 |
| JP | 2006-241256 A | | 9/2006 |
| JP | 2006241256 A | * | 9/2006 |
| JP | 2007-314774 A | | 12/2007 |
| JP | 2008-73720 A | | 4/2008 |

OTHER PUBLICATIONS

Extended European Search Report dated Apr. 16, 2018 in Patent Application No. 15843592.5.
International Search Report dated Dec. 22, 2015 in PCT/JP2015/076059 filed Sep. 14, 2015.

* cited by examiner

Primary Examiner — Kara B Boyle
(74) Attorney, Agent, or Firm — Oblon, McClelland, Maier & Neustadt, L.L.P.

(57) ABSTRACT

An expandable poly methyl methacrylate particle including a polymer, which is obtained by a process including polymerizing monomers including 100 parts by weight of an acrylic monomer and from 0.05 to 0.15 parts by weight of a polyfunctional monomer. The acrylic monomer includes 90% to 98% by weight of methyl methacrylate and 2% to 10% by weight of an $C_{2-8}$ alkyl acrylate, relative to a total weight of the methyl methacrylate and the $C_{2-8}$ alkyl acrylate.

17 Claims, No Drawings

EXPANDABLE METHYL METHACRYLATE RESIN PARTICLES, PRE-EXPANDED PARTICLES, EXPANSION MOLDED ARTICLE, AND LOST FOAM

TECHNICAL FIELD

The present invention relates to: an expandable poly methyl methacrylate particle which exhibits excellent flame retardancy and heat resistance, and contain a volatile organic compound in a reduced amount; a pre-expanded particle; an expanded mold article; and a lost foam.

BACKGROUND ART

For the casting of a metal, a lost foam casting method (a full mold method) is known, in which metal casting is carried out by pouring a molten metal into an embedded pattern made from an expanded mold article in casting sand to replace the pattern with the molten metal. In general, in the full mold method, a residue from a burned ember of the expanded mold article may cause the defects in the cast metal, and therefore attempts have been made to reduce the residue during the casting.

For example, in Patent Document 1, an example is proposed in which a styrene-based expanded mold article is used in a full mold method. A styrene-based expanded mold article is predisposed to produce a residue by smoke and soot, and the reduction of a residue is attempted by a method in which styrene-based seed particles having metal silicon melt-kneaded therein are employed. In this method, however, it is needed to use metal silicon in a large amount, and the resultant product does not meet the requirements for cost and quality satisfactorily.

On the other hand, a methyl methacrylate expanded article is known to rarely produce a residue. In Patent Documents 2, 3 and 4, proposed are methyl methacrylate expanded articles that is suitable for a full mold method. With respect to a methyl methacrylate expanded article, the viscosity of the resin upon melting is not suitable for steam expansion, and it is difficult to expand the resin at a high expansion ratio and to achieve the internal melting during molding. In Patent Document 2, the expandability and moldability of an expanded article are improved by a copolymerization of styrene monomer with methyl methacrylate monomer, however, the satisfactory reduction of a residue is not achieved because of a styrene monomer contained. In Patent Documents 3 and 4, the attempts are made to improve the foaming behavior of an expanded article by a copolymerization of methyl methacrylate monomer with methyl acrylate monomer, however, the resultant molded articles are predisposed to be broken upon the resin deformation, and a problem still exists that the molded articles crack easily upon cutting or casting operation.

In Patent Document 5, a cross-linked methacrylic expanded article is proposed that is suitable for incineration disposal. In this case, however, the expanded article is highly cross-linked for the burning property control, and the expanded article has a problem that it cannot be expanded to an expansion ratio level suitable for a lost foam.

In Patent Document 6, resin particles produced by a copolymerization of methyl methacrylate monomer with isobutyl methacrylate and an expanded mold article produced from the resin particles are proposed. However, some of the products are insufficient with respect to strength.

PRIOR ART DOCUMENTS

Patent Documents

Patent Document 1: JP2008-73720 A
Patent Document 2: JP2007-314774 A
Patent Document 3: JP2001-233986 A
Patent Document 4: JP2006-241256 A
Patent Document 5: JPH11-269300 A
Patent Document 6: JP2001-123001 A

SUMMARY OF THE INVENTION

Problems to be Solved by the Invention

In the light of the above-mentioned situations, the present invention addresses the problem of providing a methyl methacrylate expanded mold article that rarely generates smoke and soot upon ignition, that can be expanded at a high expansion ratio, and that is hardly broken upon deformation.

Solutions to the Problems

The present inventors made extensive and intensive studies, and the present invention was accomplished as a result. The present invention is as follows.

The first of the present invention relates to an expandable poly methyl methacrylate particle comprising a polymer obtained from 100 parts by weight of an acrylic monomer, and not less than 0.05 parts by weight and not more than 0.15 parts by weight of a polyfunctional monomer, wherein the acrylic monomer comprises not less than 90% by weight and not more than 98% by weight of methyl methacrylate and not less than 2% by weight and not more than 10% by weight of an $C_{2-8}$ alkyl acrylate.

The second of the present invention relates to the expandable poly methyl methacrylate particle according to the first of the present invention, wherein the weight average molecular weight measured by gel permeation chromatography (GPC) in terms of polystyrene is not less than 300,000 and not more than 350,000.

The third of the present invention relates to the expandable poly methyl methacrylate particle according to the first or second of the present invention, wherein a solvent having a boiling point of not lower than 50° C. is contained in an amount of not less than 1.5% by weight and not more than 3.0% by weight.

The forth of the present invention relates to the expandable poly methyl methacrylate particle according to any one of the first to third of the present invention, wherein a bifunctional monomer is additionally contained in an amount of not less than 0.08% by weight and 0.12% by weight.

The fifth of the present invention relates to the expandable poly methyl methacrylate particle according to any one of the first to fourth of the present invention, wherein not less than 2.2% by weight and not more than 3.5% by weight of the solvent having a boiling point of not lower than 50° C. is added during a period from a polymerization step through a foaming agent impregnation step.

The sixth of the present invention relates to a poly methyl methacrylate pre-expanded particle produced by pre-expanding the expandable poly methyl methacrylate particle as recited in the first to fifth of the present invention.

The seventh of the present invention relates to an expanded mold article produced by molding the poly methyl methacrylate pre-expanded particle as recited in the sixth of the present invention.

The eighth of the present invention relates to the expanded mold article according to the seventh of the present invention, wherein the amount of displacement at point of rupture in a flexural test is not less than 20 mm.

The ninth of the present invention relates to a lost foam produced from the expanded mold article as recited in the seventh or eighth of the present invention.

Effects of the Invention

According to the present invention, a poly methyl methacrylate expanded mold article is provided which rarely generates smoke and soot upon ignition, which can be expanded at a high expansion ratio, and which is hardly broken upon deformation. A poly methyl methacrylate article is also provided which can be used suitably in a lost foam for metal casting use or an architectural construction.

MODE FOR CARRYING OUT THE INVENTION

The expandable resin particle according to the present invention is produced by polymerizing 100 parts by weight of an acrylic monomer, and not less than 0.05 parts by weight and not more than 0.15 parts by weight of a bifunctional monomer, wherein the acrylic monomer comprises not less than 90% by weight and not more than 98% by weight of methyl methacrylate, acrylic acid and not less than 2% by weight and not more than 10% by weight of a $C_{2-8}$ alkyl ester of acrylic acid (also referred to as "a $C_{2-8}$ alkyl acrylate", hereinbelow).

The amount ratio of the methyl methacrylate monomer to the $C_{2-8}$ alkyl acrylate monomer is preferably settled so that the amount of methyl methacrylate is not less than 92% by weight and not more than 97% by weight and the amount of the $C_{2-8}$ alkyl acrylate is not less than 3% by weight and not more than 8% by weight, and is more preferably settled so that the amount of methyl methacrylate is not less than 93% by weight and not more than 96% by weight and the amount of the $C_{2-8}$ alkyl acrylate is not less than 4% by weight and not more than 7% by weight, given that the total amount of methyl methacrylate and the $C_{2-8}$ alkyl acrylate is 100% by weight. When the content of the methyl methacrylate monomeric component is too large, the expandability and moldability of the resultant expandable resin particle tend to be deteriorated and hence it often becomes difficult to produce an expanded mold article having a beautiful surface, and when the content of the $C_{2-8}$ alkyl acrylate monomeric component is too large, an expanded mold article produced from the expandable resin particle is predisposed to shrink.

The number of carbon atoms in an alkyl moiety in the $C_{2-8}$ alkyl acrylate is preferably 3 to 7, more preferably 3 to 5, particularly preferably 4. Specific examples of the alkyl acrylate include ethyl acrylate, propyl acrylate, butyl acrylate, pentyl acrylate, hexyl acrylate, heptyl acrylate, octyl acrylate and 2-ethylhexyl acrylate.

In addition to methyl methacrylate and the acrylic monomer including the $C_{2-8}$ alkyl acrylate, the expandable poly methyl methacrylate particle may also contain other monomers capable of copolymerize with the acrylic monomer in such an amount that the present invention can not be interfered. Styrene monomer may also be contained, as long as the amount of styrene monomer is quite small, and other (meth)acrylic monomers may also be contained. Specific examples of the above-mentioned other (meth)acrylic monomers include: (meth)acrylic acid such as acrylic acid and methacrylic acid; methyl acrylate; and a $C_{2-8}$ alkyl methacrylate such as ethyl methacrylate, propyl methacrylate, butyl methacrylate, pentyl methacrylate, hexyl methacrylate and 2-ethylhexyl methacrylate.

The amount of the above-mentioned other monomers to be contained is preferably not more than 10 parts by weight, more preferably not more than 5 parts by weight, still more preferably not more than 1 part by weight, and may be 0 parts by weight, relative to the total amount of 100 parts by weight, of methyl methacrylate and the $C_{2-8}$ alkyl acrylate.

When the total amount of methyl methacrylate monomer and the $C_{2-8}$ alkyl acrylate monomer is 100 parts by weight, it is required to use a polyfunctional monomer, preferably a bifunctional monomer, for the reduction of a residue produced during burning and the adjustment of the molecular weight of the resin particle. Specific examples of the polyfunctional monomer, particularly the bifunctional monomer, include: an product of the esterification of hydroxy groups respectively located at both ends of ethylene glycol or an oligomer thereof with acrylic acid or methacrylic acid, such as ethylene glycol di(meth)acrylate, diethylene glycol di(meth)acrylate and triethylene glycol di(meth)acrylate; a product of the esterification of a hydroxy group in a dihydric alcohol (particularly an alkane diol) with acrylic acid or methacrylic acid (particularly an acrylic acid), such as neopentyl glycol di(meth)acrylate, hexanediol di(meth)acrylate and butanediol di(meth)acrylate; and an aryl compound having two alkenyl groups, such as divinylbenzene.

The polyfunctional monomer (preferably bifunctional monomer) is preferably an alkane diol di(meth)acrylate, which is a product of the esterification of a hydroxy group in an alkane diol having 4 to 6 carbon atoms with acrylic acid or methacrylic acid, and is preferably hexanediol di(meth)acrylate from the viewpoint of the easiness of the adjustment of the molecular weight of the expandable resin particle. It is required to use the polyfunctional monomer (preferably bifunctional monomer) in an amount of not less than 0.05 parts by weight and not more than 0.15 parts by weight, more preferably not less than 0.08 parts by weight and not more than 0.13 parts by weight, relative to the total amount of 100 parts by weight of methyl methacrylate monomer and the $C_{2-8}$ alkyl acrylate monomer. When the amount of the polyfunctional monomer (preferably bifunctional monomer) is too small, a residue is predisposed to remain and the strength of the resultant expandable resin particle tends to be deteriorated, and when the amount of the polyfunctional monomer (preferably bifunctional monomer) is too large, the expandability and moldability of the resultant expandable resin particle tend to be deteriorated.

The expandable poly methyl methacrylate particle according to the present invention preferably has a weight average molecular weight of not less than 300,000 and not more than 380,000, more preferably not less than 300,000 and not more than 350,000, as measured in terms of polystyrene by gel permeation chromatography (GPC). When the weight average molecular weight is too small, a residue is predisposed to remain during casting and when the weight average molecular weight is too high, it may be difficult to obtain a molded article having good surface characteristics.

As the method for producing the expandable resin particle according to the present invention, a suspension polymerization method can be presented in which the polymerization is carried out in an aqueous suspension.

The term "an aqueous suspension" as used herein refers to a state where resin particles and monomer droplets are dispersed in water or an aqueous solution by means of stirring or the like. In this regard, a water-soluble surfactant or monomer may be dissolved in water, or a water-insoluble dispersant, initiator, chain transfer agent, cross-linking agent, foam cell modifier, flame retardant agent, plasticizer or the like may be dispersed together.

The amount ratio of the resin to water, more specifically, (amount of the resultant methacrylic acid resin)/(amount of water), is preferably 1.0/0.6 to 1.0/3.0.

Specific examples of the dispersant which can be used in the suspension polymerization include: a poorly water-soluble inorganic salt such as tricalcium phosphate, magnesium pyrophosphate, hydroxyl apatite and kaolin; and a water-soluble polymer such as polyvinyl alcohol, methyl cellulose, polyacrylamide and polyvinylpyrrolidone. In the case where a poorly water-soluble inorganic salt is used, it is effective to use an anionic surfactant, such as sodium α-olefin sulfonate and sodium dodecylbenzenesulfonate, in combination with the dispersant. If necessary, an additional amount of the dispersant may be added during the polymerization.

The amount of the dispersant may be adjusted depending on the types of the dispersant. In the case where a poorly water-soluble inorganic salt is adopted, the amount is preferably not less than 0.03 parts by weight and not more than 0.35 parts by weight relative to 100 parts by weight of water. In the case where an anionic surfactant or a water-soluble polymer is adopted, the amount is preferably not less than 30 ppm and not more than 100 ppm.

It is preferred that the suspension polymerization in the present invention is carried out in such a manner that a first-stage polymerization is carried out to achieve the main reaction and a second-stage polymerization is carried out thereafter at a temperature higher than the temperature employed in the first-stage polymerization to reduce the amounts of residual monomers.

The polymerization initiator to be used in the polymerization may be a radical-generating polymerization initiator that may be used generally in the production of thermoplastic polymers. Typical examples of the polymerization initiator include: an organic peroxide such as benzoyl peroxide, lauroyl peroxide, t-butylperoxy benzoate, isopropyl-t-butylperoxy carbonate, butyl perbenzoate, t-butylperoxy-2-ethyl hexanoate, t-butyl perpivalate, t-butylperoxy isopropylcarbonate, di-t-butylperoxy hexahydroterephthalate, 1,1-di(t-butylperoxy)-3,3,5-trimethylcyclohexane, 1,1-bis(t-amylperoxy)-3,3,5-trimethylcyclohexane, 1,1-bis(t-butylperoxy)cyclohexane and t-butylperoxy-2-ethylhexyl monocarbonate; and an azo compound such as azobisisobutyronitrile and azobisdimethylvaleronitrile. These polymerization initiators may be used singly, or two or more of them may be used in combination. Among these, an organic peroxide is preferred.

The total amount of the polymerization initiator to be used in the first-stage polymerization and the second-stage polymerization is, for example, preferably not less than 0.1 parts by weight and not more than 0.5 parts by weight relative to 100 parts by weight of the monomers.

In the polymerization in the present invention, it is preferred to use a known chain transfer agent which is used in the polymerization of methyl methacrylate. Specific examples of the chain transfer agent include: a monofunctional chain transfer agent such as an alkyl mercaptan (e.g., n-dodecyl mercaptan), and a thioglycolic acid ester; and a polyfunctional chain transfer agent which is a product of the esterification of a hydroxy group in a polyhydric alcohol, including ethylene glycol, neopentyl glycol, trimethylolpropane and sorbitol, with thioglycolic acid or 3-mercaptopropionic acid.

Specific example of the foaming agent include volatile foaming agents, such as an aliphatic hydrocarbon that is a hydrocarbon having not less than 3 and not more than 5 carbon atoms (particularly having 4 carbon atoms), including propane, isobutane, normal-butane, isopentane, normal-pentane, neopentane for example; a hydrofluorocarbon compound having an ozone depleting potential of 0, including difluoroethane, tetrafluoroethane. Two or more of these foaming agents may be used in combination. The amount of the foaming agent to be used is preferably not less than 5 parts by weight and not more than 12 parts by weight, still more preferably not less than 7 parts by weight and not more than 10 parts by weight, relative to 100 parts by weight of the expandable poly methyl methacrylate particles. When the amount of the foaming agent is too small, it becomes difficult to achieve the desired expansion ratio, and when the amount of the foaming agent is too high, the coagulation of the resin tends to occur during the foaming agent impregnation step.

As the additives to be used in the present invention, a solvent, a plasticizer, a foam cell modifier and the like can be used depending on the intended use. The solvent to be used includes a solvent having a boiling point of not lower than 50° C., and the specific examples of the solvent include: an aromatic hydrocarbon having not less than 6 carbon atoms such as toluene; an aliphatic hydrocarbon (particularly a linear hydrocarbon) having not less than 6 carbon atoms such as hexane and heptane; and an alicyclic hydrocarbon having not less than 6 carbon atoms such as cyclohexane and cyclooctane. Among these solvents, an aromatic hydrocarbon or an alicyclic hydrocarbon, such as toluene and cyclohexane, is preferred from the viewpoint of the expandability of the expandable resin particle. The boiling point of the solvent is preferably not lower than 50° C. and not higher than 160° C., more preferably not lower than 75° C. and not higher than 120° C. The solvent is contained in the expandable poly methyl methacrylate particle preferably in an amount of not less than 1.1% by weight and not more than 3.3% by weight, more preferably in an amount of not less than 1.5% by weight and not more than 3.0% by weight. When the amount is not more than 1.5% by weight, sufficient foaming performance can not be achieved, and when the amount is not less than 3.0% by weight, the formation of blisters is predisposed to occur on the surface of the resultant molded article upon molding, which results in the deterioration in dimensional stability of the molded article.

The solvent that has a boiling point of not lower than 50° C. can be contained in the expandable poly methyl methacrylate particle of the present invention in the above-mentioned amount, by adding the solvent during a period from the polymerization step through the foaming agent impregnation step in an amount of preferably not less than 1.8 parts by weight and not more than 3.8 parts by weight, more preferably not less than 2.2 parts by weight and not more than 3.5 parts by weight, relative to the total amount of 100 parts by weight of methyl methacrylate, the $C_{2-8}$ alkyl acrylate and the bifunctional monomer.

Examples of the plasticizer include a high-boiling-point plasticizer having a boiling point of not lower than 200° C., and the specific examples of the high-boiling-point plasticizer include: a fatty acid glyceride such as stearic acid triglyceride, palmitic acid triglyceride, lauric acid triglyceride, stearic acid diglyceride and stearic acid monoglyceride; a vegetable oil such as coconut oil, palm oil and palm kernel oil; an aliphatic ester such as dioctyl adipate and dibutyl sebacate; and an organic hydrocarbon such as liquid paraffin and cyclohexane. The specific examples of the foam cell modifier include: an aliphatic bisamide, such as methylenebis(stearic acid amide) and ethylenebis(stearic acid amide); and a polyethylene wax.

The expandable poly methyl methacrylate particle thus produced can be formed into pre-expanded particle by a conventional pre-expansion method. Specifically, the expandable poly methyl methacrylate particles are placed in a vessel equipped with a stirrer and then heated with a heat source such as steam to pre-expand the expandable resin particles until a desired expansion ratio is achieved. For example, the pre-expansion ratio is preferably 30 to 70 times, more preferably 40 to 65 times.

The temperature to be employed for the pre-expansion is preferably 102 to 105° C.

The poly methyl methacrylate pre-expanded particle can be molded by a conventional in-mold molding method to produce an expanded mold article. Specifically, a poly methyl methacrylate expanded mold article is produced by first filling a mold that can be closed but not hermetically with the poly methyl methacrylate pre-expanded particles and then heat-melting the particles by steam.

The density of the molded article is preferably 14.3 to 33.3 kg/m$^3$.

The deflection of the poly methyl methacrylate expanded mold article according to the present invention is preferably not less than 20 mm as measured in a bending test when the article is produced by pre-expanding at an expansion ratio of 55 times and then molding the pre-expanded product.

This application claims the benefit of priority to Japanese Patent Application No. 2014-192421 filed on Sep. 22, 2014. The entire contents of the specifications of Japanese Patent Application No. 2014-192421 filed on Sep. 22, 2014 are incorporated herein by reference.

EXAMPLES

Hereinbelow, examples and comparative examples will be described. However, the present invention is not intended to be limited by these examples.
(Measurement of the Solvent Amounts in an Expandable Poly Methyl Methacrylate Particle)

Expandable poly methyl methacrylate particles (0.25 g) were dissolved in methylene chloride (20 cc) (cyclopentanol as internal standard), and each amount of toluene and cyclohexane in the expandable poly methyl methacrylate particles was quantified from a calibration curve by gas chromatography (GC-14B, manufactured by Shimadzu Corporation, column: 3 m, filler: PEG-20M 25%, column temperature: 110° C., carrier gas: helium).
(Measurement of the Weight Average Molecular Weight)

Expandable poly methyl methacrylate particles (0.02 g) were dissolved in tetrahydrofuran (20 cc), and the weight average molecular weight of the expandable poly methyl methacrylate particle was determined by GPC (HLC-8020, manufactured by Tosoh Corporation, column: TSKgel Super HZM-H, column temperature: 40° C., flow rate: 0.35 mL/1 min.). The weight average molecular weight was determined as a value in terms of standard polystyrene.
(Production of Pre-Expanded Particles)

Expandable poly methyl methacrylate particles were sieved to collect expandable resin particles each having a particle diameter of 0.5 to 1.4 mm.

The collected expandable poly methyl methacrylate particles were pre-expanded at a bulk expansion ratio of 55 times with a pressurized pre-expansion machine ("BHP", manufactured by Obiraki Kogyo) under the condition of a blowing steam pressure of 0.09 to 0.10 MPa, and the resultant product was allowed to leave under ambient temperature for 1 day to produce pre-expanded particles having a bulk expansion ratio of 55 times.
(Production of Expanded Mold Article)

The poly methyl methacrylate pre-expanded particle thus produced were subjected to in-mold molding with a molding machine "KR-57" (manufactured by Daisen Co., Ltd.) under a blowing steam pressure of 0.05 MPa to produce a flat-plate-like expanded mold article having a size of 400 mm long×350 mm wide×150 mm thick.
(Surface Characteristics of Molded Article)

The condition of the surface of the expanded mold article was evaluated by observing the surface with naked eyes. A larger numerical value means a more beautiful surface condition having little void spaces formed between particles, and a numerical value of not less than 3 as rated on a scale of one to five was determined as "acceptable".
5: No void space was observed.
4: Voids were observed partly, but were almost unnoticeable.
3: Voids were observed at some places, but were acceptable as a whole.
2: Voids were noticeable.
1: Many void spaces were observed.
(Deflection at Break in a Bending Test)

The pre-expanded particles thus produced were subjected to in-mold molding with a molding machine "KR-57" (manufactured by Daisen Co., Ltd.) under a blowing steam pressure of 0.05 MPa to produce a flat-plate-like expanded mold article having a size of 400 mm long×350 mm wide× 20 mm thick. A test specimen having a size of 75 mm wide×350 mm long×20 mm thick was cut out from the expanded mold article, and was then subjected to a bending test in accordance with JIS A 9511.

The deflection of the article at break was measured, and the average value of the measurement for four times was defined as the deflection at break.

Example 1

Into a 6-L autoclave equipped with a stirrer, charged were 150 parts by weight of water, 0.105 parts by weight of tricalcium phosphate, 0.0075 parts by weight of sodium α-olefin sulfonate, 0.08 parts by weight of lauroyl peroxide, 0.1 parts by weight of 1,1-bis(t-butylperoxy)cyclohexane, 0.1 parts by weight of 1,6-hexanediol diacrylate (0.09 vinyl group mol % relative to the amount of the methyl methacrylate monomer) and 0.24 parts by weight of n-dodecyl mercaptan. Subsequently, 96.5 parts by weight of methyl methacrylate, 3.5 parts by weight of butyl acrylate and 1 part by weight of toluene were further charged into the autoclave, and then polymerization was carried out at 80° C. for about 4 hours and 20 minutes. Subsequently, 1.5 parts by weight of cyclohexane and 9 parts by weight of normal-rich butane (normal/iso=70/30) were charged into the autoclave, and then the temperature of the autoclave was raised to 102° C. and polymerization was carried out for 10 hours. The polymerization product was cooled, washed, dehydrated and then dried to produce expandable poly methyl methacrylate particles.

The expandable poly methyl methacrylate particles thus produced were sieved to collect expandable poly methyl methacrylate particles each having a particle diameter of 0.5 to 1.4 mm, and the collected expandable resin particles were subjected to the measurement of the weight average molecular weight thereof and measurement of the amounts of the solvents in the resin. The expandable poly methyl methacrylate particles were pre-expanded to produce pre-expanded particles having a bulk expansion ratio of 55 times. The pre-expanded particles thus produced were aged at room temperature for 1 day, and then molded with a KR-57 molding machine (manufactured by Daisen Co., Ltd.) in a mold having a size of 300×450×150 (t) mm to produce an expanded mold article. The surface characteristics of the obtained molded article were evaluated. In the same manner, another molded article was produced in a mold having a size of 300×450×20 mm (t), and the amount of displacement at point of rupture in a flexural test was evaluated.

Examples 2 to 8, Comparative Examples 1 to 6

The same procedure as Example 1 was carried out, except that the amounts of the monomeric components, the bifunctional monomer and the solvents were replaced with those shown in Table 1, and expandable poly methyl methacrylate particles, pre-expanded particles and expanded mold articles were produced. These products were evaluated in the same manner as mentioned above.

The results of the evaluations are shown in Table 1.

TABLE 1

| | | | Example 1 | Example 2 | Example 3 | Example 4 | Example 5 | Example 6 | Example 7 | Example 8 |
|---|---|---|---|---|---|---|---|---|---|---|
| resin preparation condition | methyl methacrylate | parts | 96.5 | 94.5 | 92.0 | 97.5 | 97.5 | 97.5 | 97.5 | 97.5 |
| | copolymerization monomer species | | BA | BA | BA | BA | BA | BA | BA | BA |
| | copolymerization monomer | parts | 3.5 | 5.5 | 9.0 | 2.5 | 3.5 | 3.5 | 3.5 | 3.5 |
| | 1,6-hexanediol diacrylate | parts | 0.1 | 0.1 | 0.1 | 0.1 | 0.13 | 0.07 | 0.1 | 0.1 |
| | toluene | parts | 1.0 | 1.0 | 1.0 | 1.0 | 1.0 | 1.0 | 2.0 | 1.0 |
| | cyclohexane | parts | 1.5 | 1.5 | 1.5 | 1.5 | 1.5 | 1.5 | 1.7 | 1.0 |
| | weight average molecular weight in terms of polystyrene | ×10$^4$ | 32.1 | 32.9 | 31.1 | 33.8 | 36.5 | 28.6 | 30.8 | 31.1 |
| evaluation | solvent component in the resin | % | 1.7 | 1.7 | 1.6 | 1.8 | 1.6 | 1.6 | 3.1 | 1.3 |
| | expansion at 55 times | | fulfilled | fulfilled | fulfilled | fulfilled | fulfilled | fulfilled | fulfilled | fulfilled |
| | surface characteristics of molded article | | 4 | 4 | 3 | 3 | 3 | 4 | 3 | 3 |
| | amount of displacement at point of rupture in a flexural test | mm | 22.1 | 22.5 | 23.9 | 22.0 | 23.5 | 21.2 | 22.3 | 21.9 |

| | | | Comparative Example 1 | Comparative Example 2 | Comparative Example 3 | Comparative Example 4 | Comparative Example 5 | Comparative Example 6 |
|---|---|---|---|---|---|---|---|---|
| resin preparation condition | methyl methacrylate | parts | 96.5 | 94.5 | 96.5 | 96.5 | 99 | 89 |
| | copolymerization monomer species | | MA | MA | BA | BA | BA | BA |
| | copolymerization monomer | parts | 3.5 | 5.5 | 3.5 | 3.5 | 1 | 11 |
| | 1,6-hexanediol diacrylate | parts | 0.1 | 0.1 | 0.04 | 0.16 | 0.1 | 0.1 |
| | toluene | parts | 1.0 | 1.0 | 1.0 | 1.0 | 1.0 | 1.0 |
| | cyclohexane | parts | 1.5 | 1.5 | 1.5 | 1.5 | 1.5 | 1.5 |
| | weight average molecular weight in terms of polystyrene | ×10$^4$ | 32.0 | 31.6 | 26.0 | 38.2 | 33.1 | 30.6 |
| evaluation | solvent component in the resin | % | 1.7 | 1.7 | 1.6 | 1.8 | 1.8 | 1.6 |
| | expansion at 55 times | | fulfilled | fulfilled | fulfilled | not reached at 55 times | not reached at 55 times | fulfilled |
| | surface characteristics of molded article | | 3 | 3 | 4 | — | — | shrunk |
| | amount of displacement at point of rupture in a flexural test | mm | 19.1 | 19.8 | 18.9 | — | — | — |

BA: butyl acrylate
MA: methyl methacrylate

The invention claimed is:

1. An expandable poly methyl methacrylate particle, comprising:
   a polymer obtained by a process comprising polymerizing monomers comprising 100 parts by weight of an acrylic monomer and from 0.05 to 0.15 parts by weight of a polyfunctional monomer,
   wherein the acrylic monomer comprises from 90% to 98% by weight of methyl methacrylate and from 2% to 10% by weight of butyl acrylate relative to a total weight of the methyl methacrylate and the butyl acrylate,
   wherein the polyfunctional monomer is a product of esterification of hydroxyl groups located at both ends of ethylene glycol or an oligomer of the ethylene glycol with acrylic acid or methacrylic acid, or a product of the esterification of a hydroxy group in an alkane diol with acrylic acid or methacrylic acid, and
   wherein an expanded mold article produced from the expandable poly methyl methacrylate particle has an amount of displacement at point of rupture of at least 20 mm when a flexural test is performed on the expanded mold article.

2. The expandable poly methyl methacrylate particle according to claim 1, wherein the expandable poly methyl methacrylate particle has a weight average molecular weight measured by gel permeation chromatography (GPC) in terms of polystyrene of from 300,000 to 350,000.

3. The expandable poly methyl methacrylate particle according to claim 1, further comprising:
   from 1.5% to 3.0% by weight, relative to a weight of the poly methyl methacrylate particle, of a solvent having a boiling point of at least 50° C.

4. The expandable poly methyl methacrylate particle according to claim 1, wherein the polyfunctional monomer comprises a bifunctional monomer and an amount of the bifunctional monomer is from 0.08% to 0.12% by weight relative to the total weight of the methyl methacrylate and the butyl acrylate in the acrylic monomer.

5. The expandable poly methyl methacrylate particle according to claim 1, wherein the process further comprises adding a solvent having a boiling point of at least 50° C. after the polymerizing and before impregnating a foaming agent, and an amount of the added solvent is from 2.2% to 3.5% by weight relative to a total weight of the methyl methacrylate, the butyl acrylate, and the polyfunctional monomer.

6. A poly methyl methacrylate pre-expanded particle, produced by pre-expanding the expandable poly methyl methacrylate particle of claim 1.

7. An expanded mold article, produced by molding the poly methyl methacrylate pre-expanded particle of claim 6.

8. A lost foam, produced from the expanded mold article of claim 7.

9. The expandable poly methyl methacrylate particle according to claim 1, wherein the polyfunctional monomer comprises a bifunctional monomer.

10. The expandable poly methyl methacrylate particle according to claim 3, wherein the process further comprises adding from 2.2% to 3.5% by weight of the solvent relative to a total weight of the methyl methacrylate, the butyl acrylate, and the polyfunctional monomer, after the polymerizing and before impregnating a foaming agent.

11. The expandable poly methyl methacrylate particle according to claim 1, wherein the acrylic monomer comprises from 92% to 97% by weight of methyl methacrylate and from 3% to 8% by weight of butyl acrylate relative to the total weight of the methyl methacrylate and the butyl acrylate.

12. The expandable poly methyl methacrylate particle according to claim 1, wherein the acrylic monomer comprises from 93% to 96% by weight of methyl methacrylate and from 4% to 7% by weight of butyl acrylate relative to the total weight of the methyl methacrylate and the butyl acrylate.

13. The expandable poly methyl methacrylate particle according to claim 1, wherein the expandable poly methyl methacrylate particle has a particle diameter of from 0.5 mm to 1.4 mm.

14. The expandable poly methyl methacrylate particle according to claim 1, wherein the acrylic monomer consists of the methyl methacrylate and the butyl acrylate.

15. The expandable poly methyl methacrylate particle according to claim 1, wherein the monomers further comprise not more than 10 parts by weight of a second acrylic monomer relative to 100 parts by weight of the acrylic monomer, and the second acrylic monomer comprises at least one selected from the group consisting of acrylic acid, methacrylic acid, methyl acrylate, ethyl methacrylate, propyl methacrylate, butyl methacrylate, pentyl methacrylate, hexyl methacrylate, and 2-ethylhexyl methacrylate.

16. The expandable poly methyl methacrylate particle according to claim 1, wherein the polyfunctional monomer is a product of esterification of hydroxy groups located at both ends of ethylene glycol with acrylic acid or methacrylic acid, or a product of the esterification of a hydroxy group in an alkane diol having 4 to 6 carbon atoms with acrylic acid or methacrylic acid.

17. The expandable poly methyl methacrylate particle according to claim 1, wherein the amount of the polyfunctional monomer is from 0.08 to 0.13 parts by weight, relative to the total amount of 100 parts by weight of the acrylic monomer.

* * * * *